United States Patent
Bieber et al.

(10) Patent No.: US 7,197,956 B2
(45) Date of Patent: Apr. 3, 2007

(54) THRUST PIECE UNIT FOR RACK-AND-PINION STEERING MECHANISMS

(75) Inventors: Juergen Bieber, Schwaebisch Gmuend (DE); Rainer Schaenzel, Essingen (DE); Michael Schmidt, Pluederhausen (DE)

(73) Assignee: ZF Lenksysteme GmbH, Gmuend (DE)

( * ) Notice: Subject to any disclaimer, the term of this patent is extended or adjusted under 35 U.S.C. 154(b) by 139 days.

(21) Appl. No.: 10/914,310

(22) Filed: Aug. 9, 2004

(65) Prior Publication Data
US 2005/0039554 A1 Feb. 24, 2005

Related U.S. Application Data

(63) Continuation of application No. PCT/EP03/01949, filed on Feb. 26, 2003.

(30) Foreign Application Priority Data
Feb. 28, 2002 (DE) ................ 102 08 948

(51) Int. Cl.
*F16H 1/04* (2006.01)
(52) U.S. Cl. .................. 74/422; 74/492; 74/493; 180/180; 180/441
(58) Field of Classification Search ........... 74/492, 74/493, 388 PS, 409, 411, 422, 89.17; 180/426, 180/427, 441; 280/671
See application file for complete search history.

(56) References Cited

U.S. PATENT DOCUMENTS 4,640,148 A * 2/1987 Hasegawa .................. 74/422
6,619,420 B1 * 9/2003 Saarinen .................... 180/428

FOREIGN PATENT DOCUMENTS

| DE | 34 08 673 | 11/1984 |
| DE | 36 37 107 | 5/1988 |
| DE | 36 37 197 | 5/1988 |
| DE | 3637107 A1 * | 5/1988 |
| DE | 199 37 254 | 2/2001 |
| GB | 1 383 517 | 2/1974 |

* cited by examiner

*Primary Examiner*—Thomas R. Hannon
*Assistant Examiner*—Justin Krause
(74) *Attorney, Agent, or Firm*—Jordan and Hamburg LLP

(57) ABSTRACT

A thrust piece unit for rack-and-pinion steering mechanisms, which is integrated into a housing bore of the steering mechanism housing of motor vehicles, in order to keep the pinion in constant intermeshing with the rack, the thrust piece unit comprising a cylinder part, a piston part and two chambers which are matched with one another and are filled with hydraulic medium and which are connected to one another via a replenishing valve and via a throttle point, and overload protection being additionally integrated in the thrust piece unit.

1 Claim, 2 Drawing Sheets

THRUST PIECE UNIT FOR RACK-AND-PINION STEERING MECHANISMS

BACKGROUND OF THE INVENTION

Figure 1:
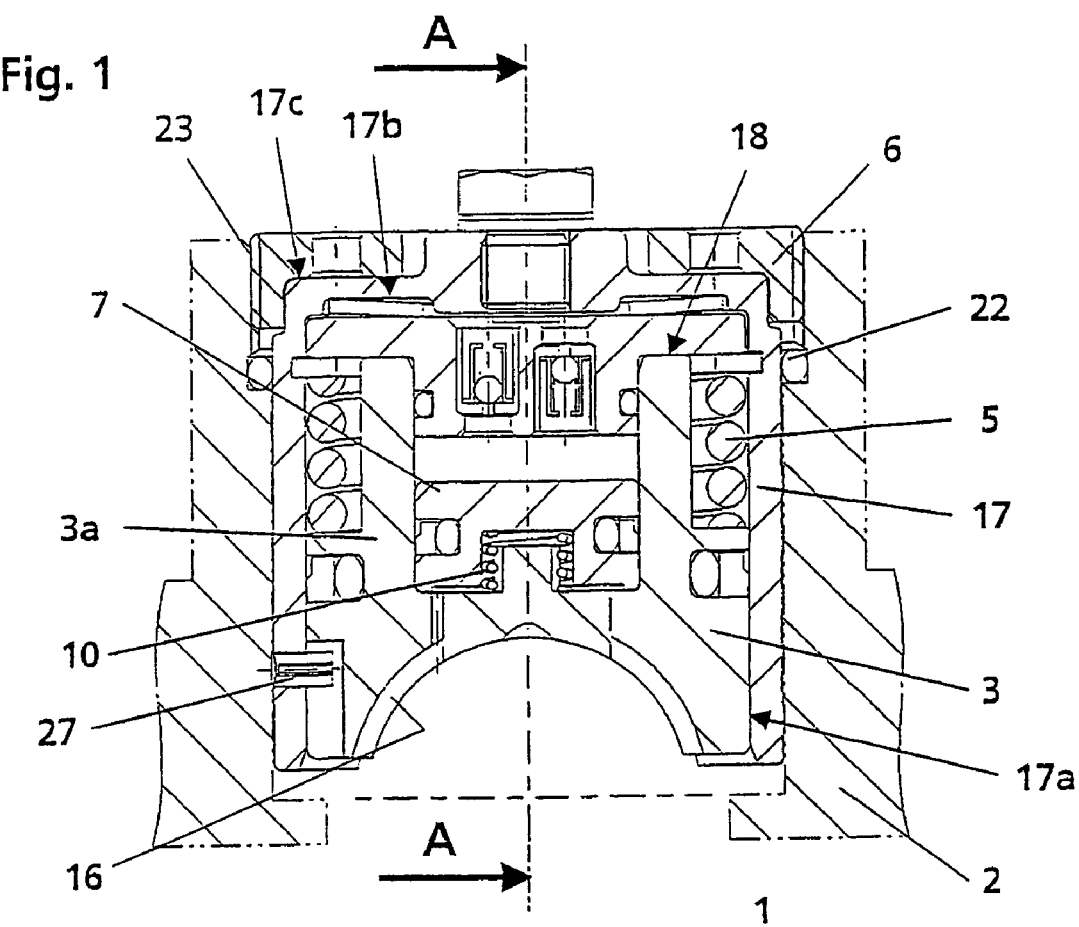

The invention relates to a thrust piece unit for rack-and-pinion steering mechanisms.

In thrust pieces of a conventional form of construction, as described in DE 34 08 673 A1, the thrust piece presses against the rear side of the rack by means of the resilient force of a spring, in order to ensure play-free meshing between rack and pinion. In this case, the spring is supported against the inside of a screwable cover, with a limited gap (play) being maintained between cover and thrust piece. The play and the resilient force of the spring can be set by the amount by which the cover is screwed in, and, when the thrust piece is subjected to load by the rack, the impact is damped according to the presetting.

Over the period of useful life, because of high forces, such as arise, for example, in the case of electromechanical rack-and-pinion steering systems, increased wear occurs on the toothing and on other components matched with one another, with the result that the gap is enlarged. The increased possibility of axial deflection of the thrust piece afforded thereby, may lead to a disturbing noise behavior, in spite, for example, of a spring between thrust piece and setscrew.

In a thrust piece unit disclosed in DE 36 37 107 A1, in order to ensure the play-free meshing of the pinion in the rack, the thrust piece, in addition to being prestressed by a spring in the conventional way, is acted upon hydraulically. The thrust piece unit is integrated in a bore of the steering mechanism housing. Said unit consists of a cylinder part and of a piston part, the cylinder part having a partition which is equipped with an nonreturn valve arranged in a throughflow orifice and with a throttle bore. The piston part, acted upon with force by a spring, is guided on the rack-facing side of the cylinder part and encloses a pressure space. On the opposite side of the partition, an adjusting piston likewise acted upon by a spring encloses a storage space. Since the pressure space is filled completely with hydraulic fluid and is closed with respect to the storage space by means of the nonreturn valve, a hydraulic cushion against the rack being lifted off from the pinion is formed. Wear which may possibly occur is compensated by the follow-up of the piston part, hydraulic medium continuing to flow via the orifice receiving the nonreturn valve and located in the partition. An inadmissible excess pressure in the pressure space due to a temperature change or to tolerance-related variations in position between the piston part and the cylinder part is avoided by means of the overflow of hydraulic medium through the throttle bore.

In rapid, jolt-like steering movements and progressive wear of the matching steering mechanism parts (the rack is, for example, worn to a differing extent in its toothing region due to the different frequency of the meshing of the pinion into its teeth), the most unfavorable possible preconditions may coincide and cause the steering mechanism to jam, since the incompressibility of the hydraulic medium is such that a deflection of a thrust piece no longer takes place and the thrust piece acts in the same way as a rigid stop. An enlarged throttle bore, which would afford a remedy in this case, would be a disadvantage in normal operation, since damping would no longer take place.

SUMMARY OF THE INVENTION

The present invention is based on the provision of a thrust piece unit of the type initially specified, in which freedom from play between rack and pinion is implemented during normal steering operation and likewise in the case of rapid, jolt-like steering movements, without any disturbing generation of noise and with high functionality. The problem is solved by means of the features listed in the characterizing part of patent claim 1, in that, in addition to the replenishing valve and a throttle point by means of which the hydraulic chambers are connected, an overload protection is arranged in the thrust piece unit.

The advantages achieved by the invention are, in particular, that, by means of the thrust piece unit, a uniform damping is obtained, irrespective of the thrust piece position, of the wear and of thermal influences, while the thrust piece unit, designed as a module, can be premounted outside the steering mechanism housing.

An exemplary embodiment of the invention is illustrated in the drawings and is explained in more detail below.

IN THE DRAWINGS

Figure 2:
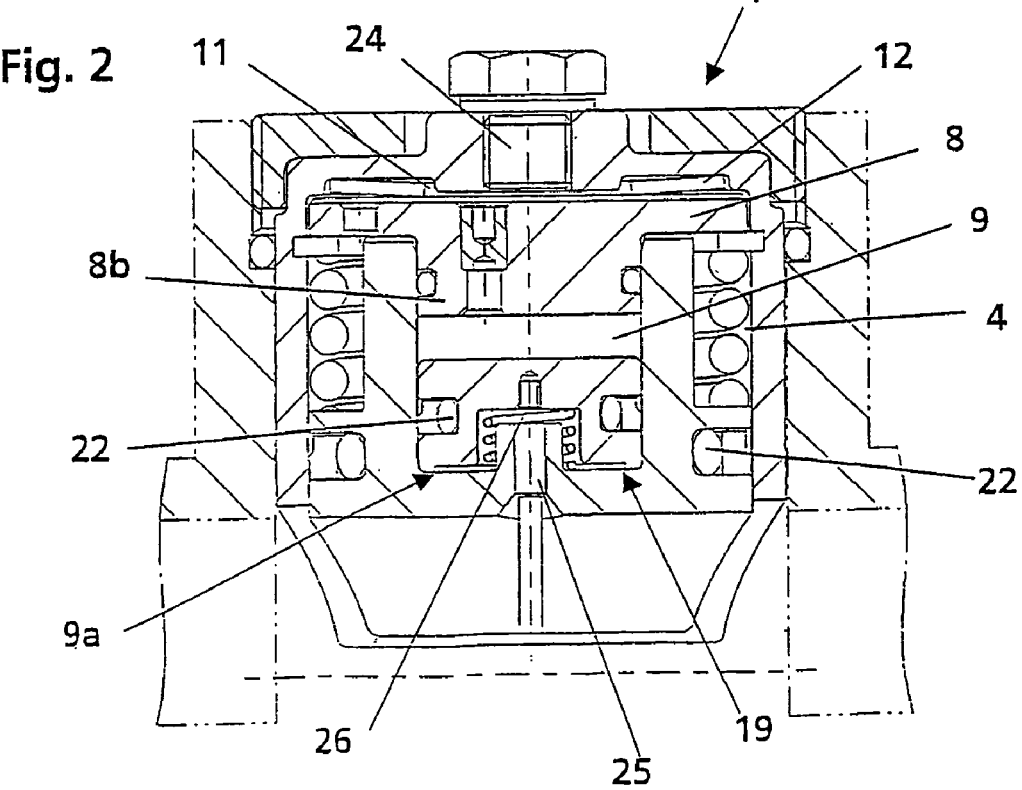
Figure 3:
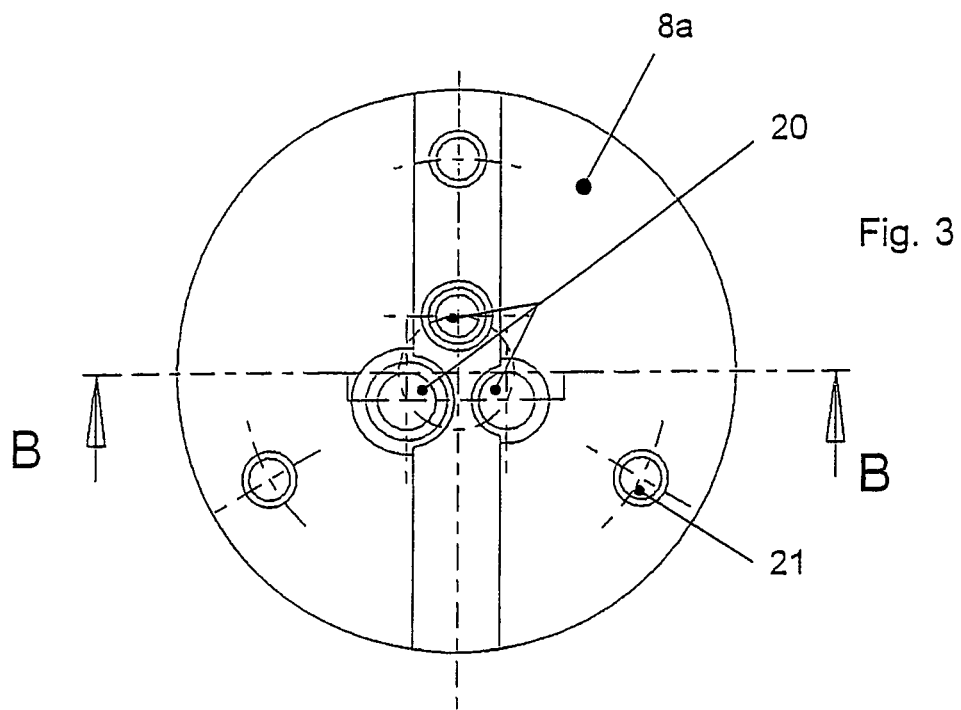
Figure 4:
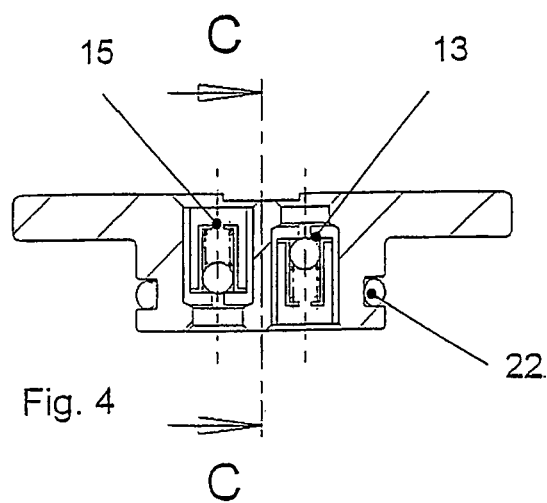
Figure 5:
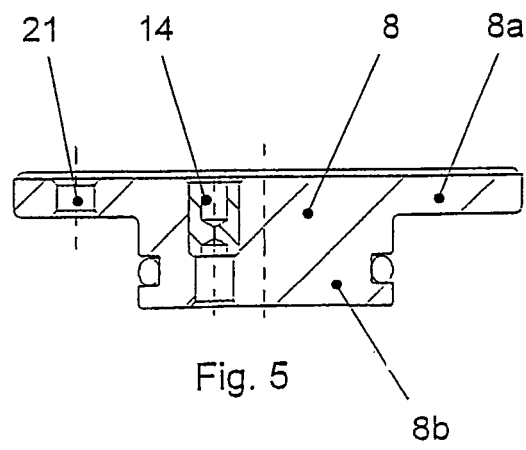

FIG. 1 shows a section through a thrust piece unit;
FIG. 2 shows the section A—A according to FIG. 1;
FIG. 3 shows a view of the piston part;
FIG. 4 shows the section B—B according to FIG. 3;
FIG. 5 shows the section C—C according to FIG. 4.

DESCRIPTION OF THE PREFERRED EMBODIMENTS

Essentially identical parts are given the same reference symbols in the various figures.

The drawing shows a thrust piece unit 1 which is used in steering mechanisms of motor vehicles, in order to keep the drive pinion, which is connected to the steering handwheel via a steering column, in constant intermeshing with the toothing of the rack, which is connected on both sides to the steerable wheels via track rods and steering levers. It is possible at any time to apply the thrust piece unit 1 to other areas of vehicle and machine construction in which rack-and-pinion transmissions are employed.

The thrust piece unit 1 is integrated into a receiving bore of the steering mechanism housing 2 in such a way that that part of the rack which is located opposite the toothing of the rack is matched with the receptacle 16 of the thrust piece unit 1, this receptacle being adapted in its geometric shape to the rack spine and being lined with a material having a low coefficient of friction.

In the application according to FIGS. 1 and 2, the thrust piece unit 1 has a cylinder part 3 movable axially to the section line A—A in the bore 17a of a cartridge 17. The cylinder part 3 is designed in such a way that the receptacle 16 for the rack spine is arranged on it on the rack side, and that, furthermore, the spatial preconditions for two hydraulic chambers 4 and 9, the piston 8 and a compensating element 7 are afforded on its side facing away from the rack spine. For this purpose, the cylinder part 3 has a hollow-cylindrical wall 3a which is arranged at a distance from the surface area of the bore 17a integrated in the cartridge 17. As a result, an annular space, the chamber 4, in which a compression spring 5 is integrated, and a cylindrical inner space, the chamber 9, are formed. The chamber 9 has arranged in it the compensating element 7, the rack-side surface of which forms a gap 19 in relation to the bottom surface 9a of the chamber 9 when the thrust piece unit 1 is in a state of rest (relieved). The piston 8, which is composed of a cylindrical head part 8*a*, the circular surface (FIG. 3) of which corresponds approximately to the borehole surface of the cartridge 17, and a cylindrical piston part 8*b*, projects with its piston part 8*b* into the chamber 9 in such a way that, when the thrust piece unit 1 is in a state of rest, an annular gap 18 can be formed between the head part 8*a* of the piston 8 and an annular surface formed by the end of the wall 3*a* of the cylinder part 3. As can be seen from FIGS. 3 to 5, the piston 8 has integrated in it six passage bores 20; 21, of which the three bores 20 passing through the piston 8 serve for receiving the replenishing valve 15, the throttle point 14 (insertion of a throttle device 14 into a bore 20 forms the possibility of varying the throughflow cross section, for example by the exchange of said throttle device, but a throttle bore may likewise be made directly in the piston 8) and an overload protection in the form of a pressure relief valve 13 in the example shown, while the other three bores 21 are integrated as connecting bores in the head part 8*a* of the piston 8. Between the head part 8*a* of the piston 8 and the bottom 17*b* of the cartridge 17 a resilient mechanical structural element is arranged in the form of a cup spring 12, which serves as overload protection and which allows the thrust piece unit 1 to ease away in a damped manner. A resilient mechanical structural element may also be integrated (not illustrated) between the setting nut 6 and the cartridge 17. The piston part 8*b* of the piston 8 and the compensating element 7 are in each case sealed off in relation to the cylindrical wall 3*a* of the cylinder part 3 by means of annular sealing elements 22. A sealing element 22 is likewise integrated between the cylinder unit 3 and cartridge 17. The cartridge 17 is held in the housing bore of the housing 2 by means of a setting nut 6. Before the adjustment of the setting nut 6, a play value (gap 18) is to be provided by means of the antirotation device 23.

In an embodiment of the thrust piece unit 1 which is not illustrated, the cylinder part 3 is fixedly connected to the piston 8. Advantageously, in this case, the seal 22, which is arranged between the cylinder unit 3 and cartridge 17 in the exemplary embodiment described and illustrated hitherto, may be dispensed with. Likewise, the function of the throttle point 14 could take place via an annular gap acting as a gap throttle, instead of a passage bore integrated in the piston 3. The possibility of play value setting, which is not present in the case of a fixed piston 8/cylinder part 3 connection because of the nonexisting gap 18, would be compensated by a gap 17*c* to be formed between the piston 8 and the cartridge 17. It is also possible that the compensating element 7, which is designed by way of example as a compensating piston, may alternatively also be formed from a diaphragm.

Before the venting and subsequent filling via the venting bore closed by means of a closing element 24 (for this purpose, the screw plug 24 is to be exchanged for a venting and filling connection piece, not illustrated), the gap 19 and the play (gap 18 and 17*c*) are to be set in abutment. For this purpose, the compensating element 7 is drawn, for example via a thread 26, through the bore 25 in the cylinder unit 3 against the bottom 9*a* of the chamber 9. By the compensating element 7 being displaced after filling, the gap 19 can be set.

During the normal operation of the steering system and consequently normal stress on the steering mechanism, the receptacle 16 and consequently the cylinder unit 3 are acted upon with force by means of a deflecting movement of the rack. During a movement of the cylinder unit 3 in the cartridge 17 which results from this, the chamber 4 filled completely with oil acts as a hydraulic cushion against the rack being lifted off from the pinion. In the event of further load on the receptacle 16 and a further linear movement of the cylinder unit 3 in the cartridge 17, an increased pressure arises in the chamber 4 which is reduced by the oil being displaced via the connecting bores 21, the connecting ducts 11 and the throttle point 14 into the chamber 9, the compensating element 7 being adjusted according to the variation in volume, and the intermeshing of the pinion/rack pair continuing to be ensured in a damping manner.

In the event of a shock-like load on the receptacle 16 and consequently on the cylinder part 3, a high pressure builds up in the chamber 4 which, as mentioned initially, can no longer be reduced solely by means of the throttle point 14. In order to avoid damage to the components, the pressure is diverted into the chamber 9 via the pressure relief valve 13, opening, for example, at 30 bar, of the piston 8, and damping takes place according to the load. Alternatively, a combination of a hydraulic component, of a pressure relief valve 13 and of a resilient mechanical component, for example cup spring 12 integrated between the cartridge 17 and piston 8 may likewise be used as overload protection, in the example, cup spring 12; pressure relief valve 13, as illustrated in FIG. 1. Irrespective of the magnitude and nature of the load, the force support (rigidity) acts as a reaction force in correlation to the action forces (toothing repulsion forces).

In the above-described application, not illustrated, of a fixed connection between the piston 8 and the cylinder part 3, a resilient mechanical structural element (for example shown as cup spring 12) may be integrated as overload protection between the cartridge 17 and setting nut 6, instead of the pressure relief valve 13, said structural element taking over the pressure reduction before components are damaged. A precondition for this would be a displaceable arrangement of the cartridge 17 in the housing 2. Such an arrangement of a resilient mechanical structural element, eg. cup spring 12 is also possible in cooperation with a hydraulic structural element as overload protection.

In the applications described, it is likewise possible for an adjustable elastic spring ring to be used as resilient mechanical overload protection (12).

During the relief of the receptacle 16 and consequently of the cylinder unit 3, the spring 5 presses the cylinder part 3 in the direction of the rack spine again. A vacuum arises in the chamber 4, with the result that the replenishing valve 15 opens and oil flows from the chamber 9 back into the chamber 4. The spring 10 ensures that an air cushion is formed in that said spring acts via a compensating element 7 counter to the oil pressure (low pressure) in the replenishing region.

A clamping pin 27 is integrated as mounting protection in the thrust piece unit 1.

The use of overload protection is also possible in other hydraulic thrust pieces in which the configuration of chambers, compensating element, piston and cylinder part is different from that described. Thus, for example, in the case of a hydraulic thrust piece according to the prior art described initially, in which the thrust piece unit consists of a cylinder part, which has been separated into an upper and a lower part by a partition, another piston part, which contains the receptacle and is integrated movably in the upper part (pressure space) of the cylinder unit, while the compensating element together with the storage space is arranged in the lower part of the cylinder part, the overload protection would be installed as a hydraulic structural element in the partition, in addition to the existing nonreturn valve and the throttle bore.

The invention claimed is:

1. A thrust piece unit for rack-and-pinion steering mechanisms, which is integrated into a housing bore of the steering mechanism housing of motor vehicles, in order to keep the pinion in constant intermeshing with the rack, said thrust piece unit comprising:

a cylinder part;

a piston part projecting into a first chamber in said cylinder part;

a second chamber being connected with said first chamber, hydraulic medium being transferrable from said first chamber to said second chamber via a replenishing valve and a throttle point; and an overload protection including a hydraulic component, the replenishing valve, the throttle point and the hydraulic component being integrated in the piston part.

* * * * *